April 2, 1963  J. W. DE POY  3,083,741
MACHINE FOR MAKING WELDED WIRE FABRIC
Filed Oct. 11, 1960  5 Sheets-Sheet 1

INVENTOR
JAMES W. DePOY
ATTORNEYS

April 2, 1963 J. W. DE POY 3,083,741
MACHINE FOR MAKING WELDED WIRE FABRIC
Filed Oct. 11, 1960 5 Sheets-Sheet 2

INVENTOR
JAMES W. DePOY
ATTORNEYS

April 2, 1963

J. W. DE POY 3,083,741

MACHINE FOR MAKING WELDED WIRE FABRIC

Filed Oct. 11, 1960

INVENTOR
JAMES W. DePOY
BY
ATTORNEYS

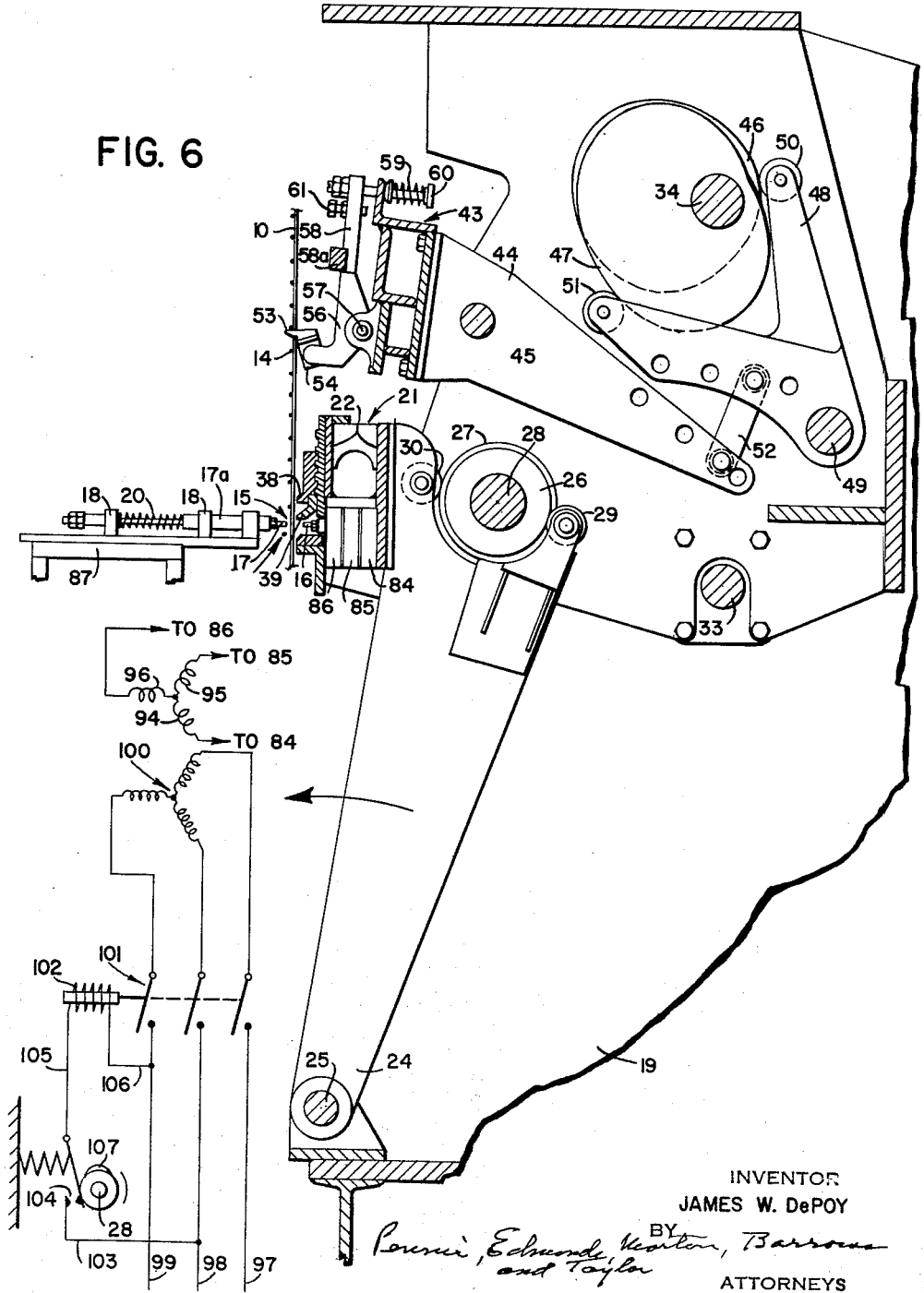

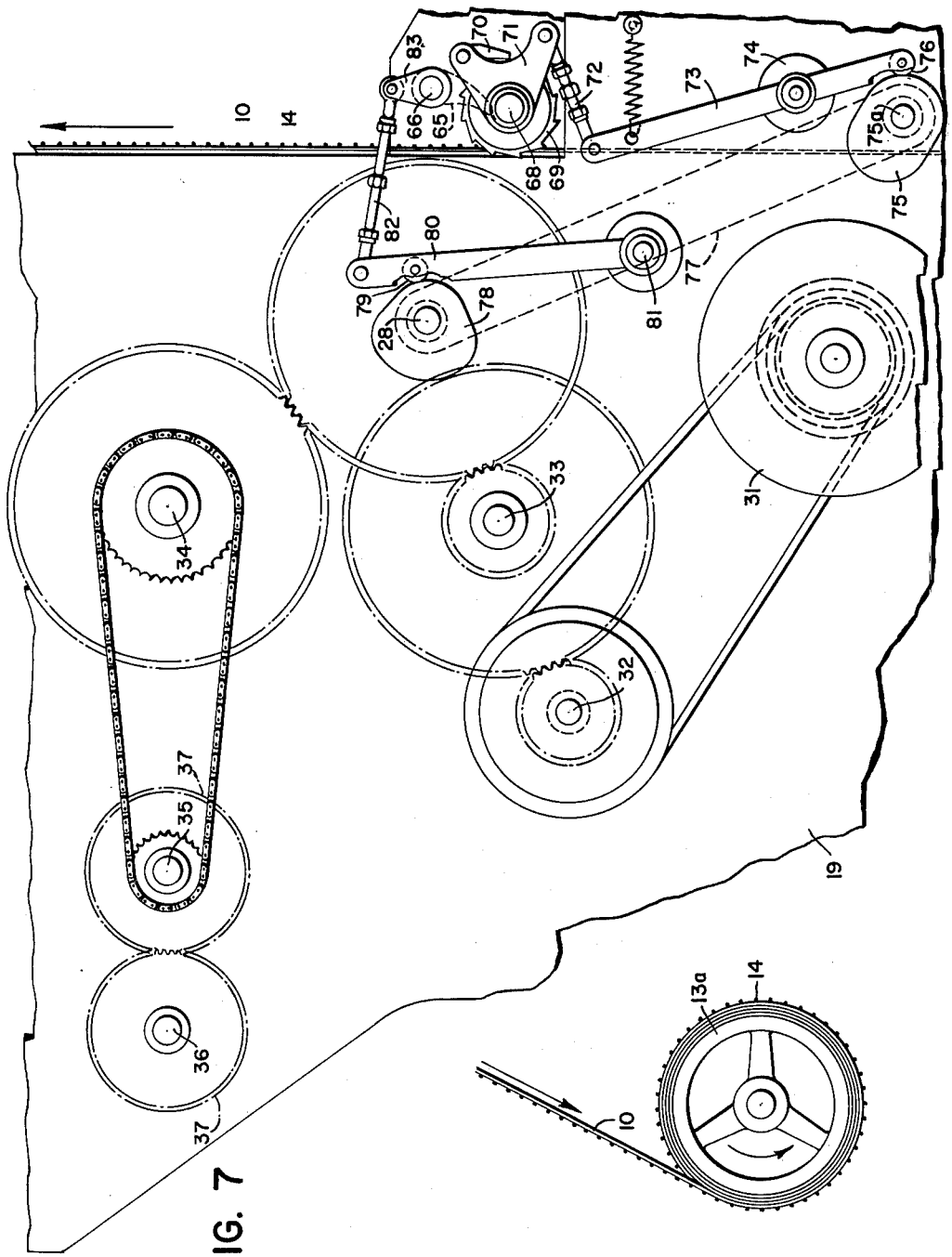

United States Patent Office 3,083,741
Patented Apr. 2, 1963

3,083,741
MACHINE FOR MAKING WELDED WIRE FABRIC
James W. De Poy, Oakland, Calif., assignor to The Colorado Fuel and Iron Corporation, Denver, Colo., a corporation of Colorado
Filed Oct. 11, 1960, Ser. No. 61,957
4 Claims. (Cl. 140—7)

This invention relates to automatic machines for making welded mesh metal fabric which is composed of uniformly spaced longitudinal wires, and uniformly spaced transverse wires extending from side-to-side of the longitudinal wires and welded thereto at their intersections. Welded fabric of this kind has various uses, one of which is that of reinforcing poured concrete structures.

Heretofore it has been found difficult to control the feed or step-by-step advance of the longitudinal wires between the application of each transverse wire with the result that the spacing between the cross-wires lacked uniformity. This was, at least in some instances caused by the fact that the extent of each step movement was controlled by mechanism which tended to magnify normal slight variations in diameter of the cross-wires and produce an accumulative error, which brought about a progressive increase in the spacing of the cross-wires throughout the length of the fabric.

In accordance with my invention the wire being placed in position for welding is gauged with respect to the immediately adjacent, or preceding, transverse wire, and the gauging takes place on the same side of both wires so that variation in wire diameter does not affect the size of the mesh.

The construction and operation of my improved apparatus will be understood by examination of the accompanying drawings and the description following. In these drawings:

FIG. 2A is an enlarged section of the gauge figures;

FIG. 2B is a view similar to 2A showing a modified gauge finger;

FIG. 6 is a view similar to FIG. 1 showing certain parts illustrated in that figure in different positions; and FIG. 7 is a fragmentary view in elevation looking towards the left-hand side of the machine (in FIG. 1 the front of the machine is at the left) and showing the main driving connections of the machine.

Figure 1:
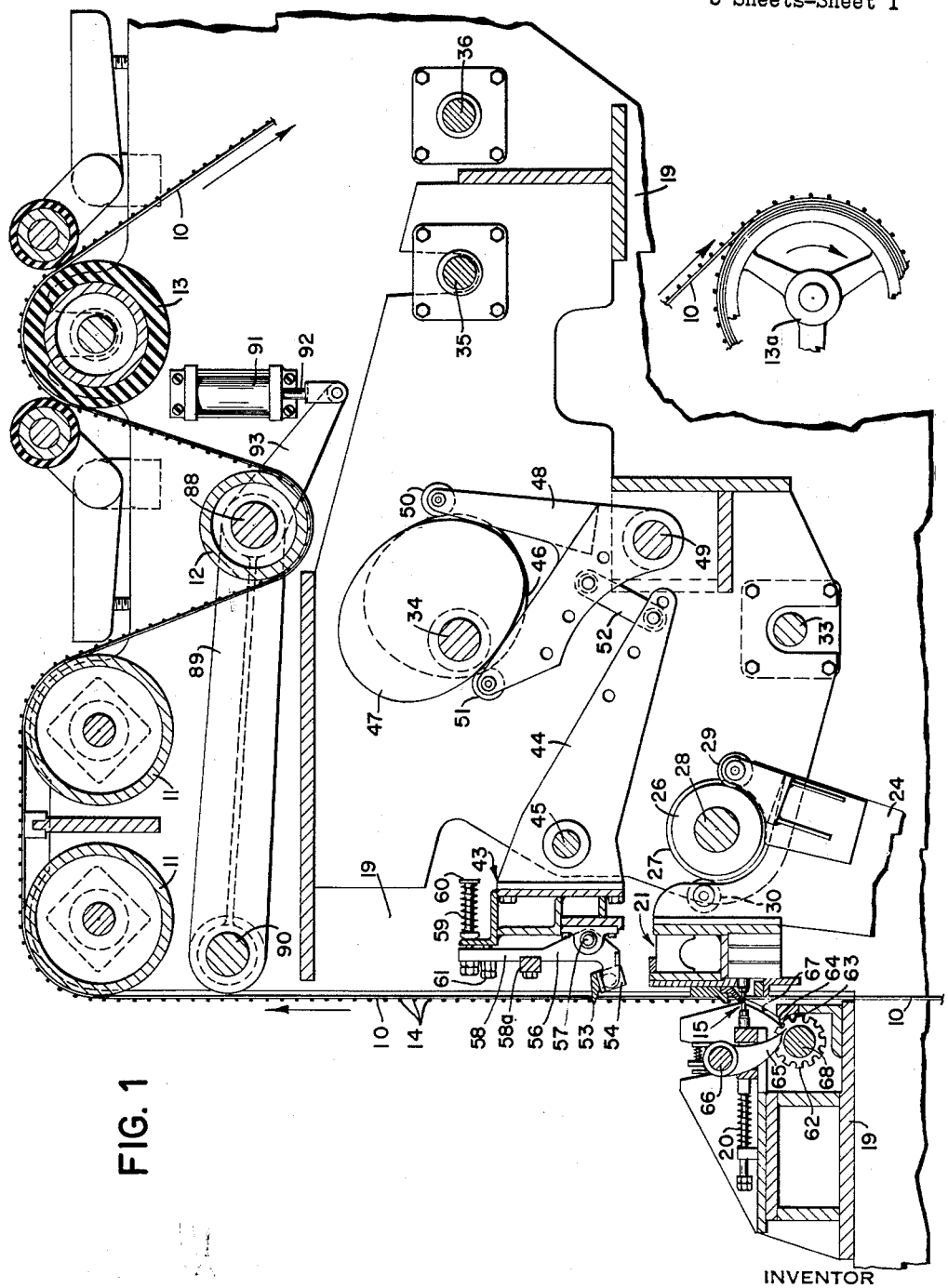
FIG. 1 is a partial vertical lengthwise section through the principal portion of the apparatus, the front of the machine being at the left.

The operator's platform (not shown) is at the front of the machine which is at the left in FIG. 1, and beneath this platform there is a bundle rack (also not shown) which includes a series of coils of wire from which the longitudinal wires 10 to form the welded mesh fabric are drawn. It will be understood that these wires 10 are arranged in equally spaced relation substantially throughout the width of the machine according to the width of welded fabric to be produced. While the fabric may be made in any desired width, the machine which is to be described by way of example produces a welded mesh fabric six feet in width and the width of the apparatus is approximately eight feet overall.

The bundle rack referred to includes a suitable brake or drag mechanism so that the wires 10 may be drawn upwardly under appropriate tension. These wires pass over guide rolls 11 at the top of the machine, thence dipping downwardly beneath a tension control roll 12, thereafter passing upwardly again over a feed roll 13, and finally downwardly toward the right end of the machine and onto a take-up roll 13a. Transverse or cross-wires 14 are applied to wires 10 at the weld point or welding position which is indicated by reference numeral 15. Cross-wires 14, each approximately six feet in length are successively welded to the longitudinal wires 10, so that above weld point 15 the welded fabric is complete.

At weld point 15 there are two sets of electrodes 16 and 17. These electrodes are arranged in pairs and in uniformly spaced relation throughout the width of the machine, corresponding to the spacing of the longitudinal wires 10.

Electrodes 16 are movable en banc towards and away from the welding position, while electrodes 17 are stationary, although they are yieldably mounted so as to squeeze the longitudinal and cross-wires together during welding. Each electrode 16 is fixed at the forward end of an electrode holder 16a, and each electrode 17 on an electrode holder 17a. In order to provide yieldability electrode holders 17a are arranged to have a limited sliding movement in supports 18 which are mounted on the frame 19 of the machine, and each electrode holder is equipped with a compression spring 20 threaded upon a rod. This rod is provided at its outer end with adjusting and lock nuts for individually adjusting the position of the electrode with respect to the welding point 15.

Figure 2:
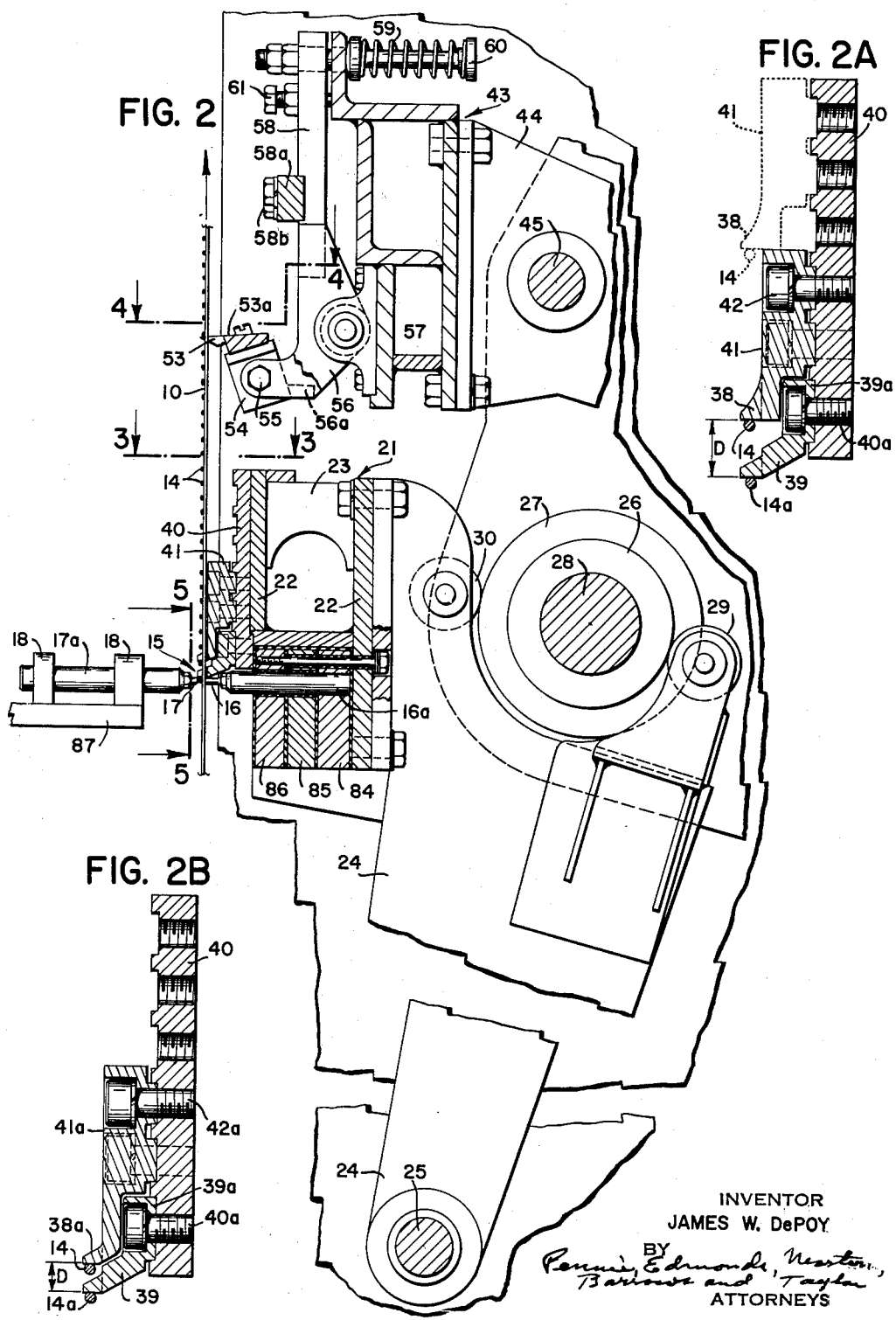
FIG. 2 is a similar section showing the principal parts at the lower left of FIG. 1 and drawn to an enlarged scale.

In order to provide for the movement of movable electrodes 16, their electrode holders 16a are securely mounted upon an electrode beam or frame 21 which extends throughout the width of the machine and is a composite structure built up from steel plates 22 and suitable spacers 23 (FIG. 2). Electrode beam 21 is supported by means of a series of rock arms 24 which are arranged in generally upright position and pivotally mounted at 25 on main frame 19 of the machine. Although only one of these rock arms 24 is shown in the drawings, it will be understood that a plurality of these rock arms are arranged in spaced relation across the width of the machine in order to provide adequate support for the electrode beam 21.

The movement of beam 21 carrying electrodes 16 to and from welding position is accomplished by means of a pair of double cams 26 and 27 (for each rock arm) which are carried on a rotating shaft 28 and which operate with follower rollers 29 and 30 mounted at the upper end of each of the rock arms 24.

Referring now to FIG. 7, this figure shows in end view the portion of the operating shafts of the apparatus which are located below tension control roll 12. The machine is driven by means of an electric motor 31 shown at the lower right of this figure. It is important to note that since FIG. 7 is a view looking at the left side of the machine (FIG. 1 shows the front of the machine at the left), FIG. 7 is a mirror image with respect to FIG. 1 of the locations of the operating shafts of the machine.

Motor 31 is belt connected to a pulley on a cross shaft 32. From shaft 32, parallel shafts 33, 28, and 34, are driven at the required rotative speeds by means of the pinions and gears indicated in FIG. 7. Shaft 34 which rotates at the same speed as shaft 28, drives shaft 35 by means of an endless chain passing over suitable sprockets. Adjacent to shaft 35 is shaft 36, and these two shafts are interconnected by a pair of changeable gears 37, the purpose of which will be referred to later on. Shaft 36 is arranged to drive feed roll 13 through mechanism not shown.

Figure 3:
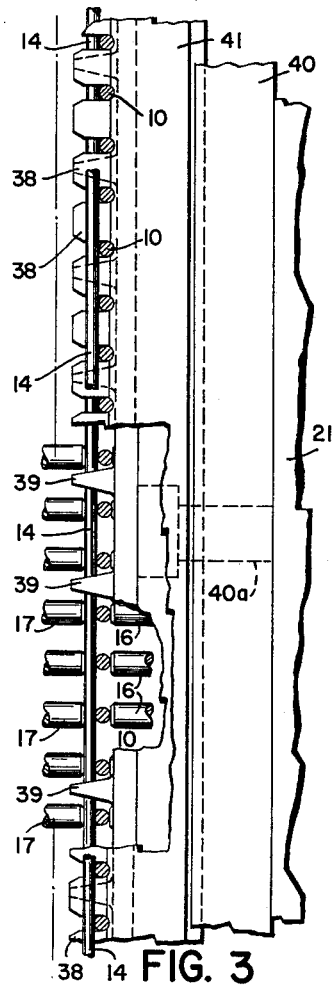
FIG. 3 is a fragmentary horizontal section taken on line 3—3 of FIG. 2, drawn to a larger scale and showing the gauge fingers in plan view.
Figure 5:
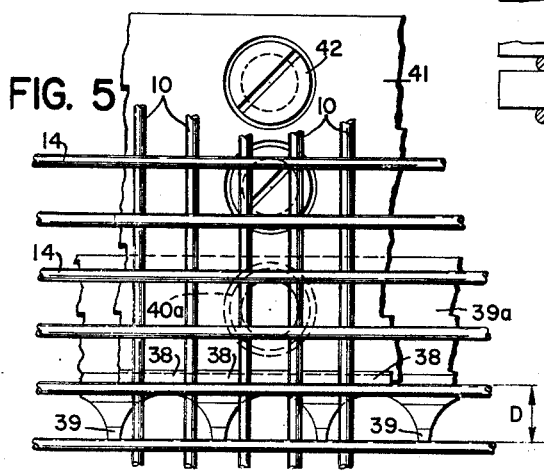
FIG. 5 is a vertical transverse section taken on line 5—5 of FIG. 2 and showing a fragment of the welded mesh fabric.

As a part of the mechanism for obtaining precise step-by-step advance of wires 10, to produce a uniform mesh, the movable electrode beam 21 carries two sets of gauge fingers 38 and 39 (FIGS. 2A, 3 and 5). Fingers 38 as will be explained in detail later on, serve to stop the advance of the completed welded mesh fabric at the end of the feeding movement, and fingers 39 serve to stop and position a new transverse or cross-wire being fed to welding position 15. Fingers 39 project from a narrow body portion 39a (FIGS. 2A and 3) which is secured in the lowermost channel or groove of a mounting plate 40 and are held in place therein by means of screws 40a. Mounting plate 40 is fixed to the front surface of electrode beam 21 in any suitable manner.

Gauge fingers 38 project from the lower portion of a body plate 41 which is secured by means of screws 42 to the front of mounting plate 40. The front surface of this gauge plate is provided by a series of parallel grooves and when it is desired to change over the apparatus so as to make welded mesh fabric having a larger mesh, the spacing of the gauge fingers 39 and 38 may be increased by shifting body plate 41 to the upper channels. As shown in FIG. 2A and also in FIGS. 1, 2 and 6, the fingers are set for 1" mesh. When it is desired to make fabric having a mesh of 2" or larger, the plate 41 is shifted upwardly so as to raise fingers 38 as just described. If it is desired to make fabric having ½" mesh, a different plate 41a (FIG. 2B) and having modified fingers 38a with much longer shank portions, is mounted upon plate 40 in place of plate 41.

When fingers 38 and 39 are shifted from the position shown in FIGS. 1 and 2, where they both project into the meshes of the fabric, to the position shown in FIG. 6 in which they are withdrawn therefrom, the longitudinal or strand wires 10 and the welded fabric above the welding point 15 are advanced in order to prepare for the placing and welding of the next cross or stay wire. The advance or upward feeding of the welded mesh fabric is produced by means of advance mechanism which is located immediately above electrode beam 21.

The advance mechanism includes an advance beam 43 which is a composite structure composed of steel plates and channels welded together lengthwise as indicated in FIG. 2. This beam structure 43 extends throughout the width of the machine and, like electrode beam 21, is supported at spaced intervals throughout its length. For this purpose it is mounted at the front ends of a series of horizontal oscillating arms 44, one of which is shown in the drawings and which are all mounted for oscillating movement on a stationary shaft 45 mounted in the machine frame 19.

These arms 44 are actuated by means of the lever and cam arrangement shown in FIGS. 1 and 6. A pair of cams 46 and 47 on rotating shaft 34 serve to impart positive oscillating movement in both directions to a forked lever 48 which is pivotally mounted at its lower end at a stationary shaft 49. Cams 46 and 47 cooperate respectively with rollers 50 and 51 carried by the respective arms of this lever. A link 52 connects forked lever 48 with the rear portion of arm 44. This link may be shifted to different apertures in lever 48 and arm 44 respectively for the purpose of increasing or decreasing the extent of oscillation of arm 44 and hence of advance beam 43.

The motion of advance beam 43 is imparted to the completed mesh fabric above the welding position 15 by means of a series of mesh advance or feeding fingers 53. These fingers project from a body plate 53a (FIG. 4) which extends throughout the working width of the machine so that a finger 53 is placed between each pair of adjacent strand wires 10 and engages one of the cross or stay wires 14 of the welded mesh fabric. Body plate 53a is secured in any desired manner to sectional supports 54 as will be presently described and pivoted at 55 to a series of supporting bracket members 56 (FIG. 2) which in turn are each pivoted at 57 to the front of advance beam 43.

Each of the several bracket members 56 which are arranged in spaced relation throughout the length of beam 43 is provided with an extension 58 and at the top of each such extension there is a compression spring 59 surrounding a bolt 60. One end of this spring engages the head of the bolt and the opposite end engages a projection on advance beam 43. This arrangement provides for overtravel of the feeding fingers 53 by compressing spring 59 after the welded mesh fabric has been advanced the desired distance. A second bolt 61 carried by extension 58 serves as a stop for adjusting the upper position of the feeding fingers 53.

Figure 4:
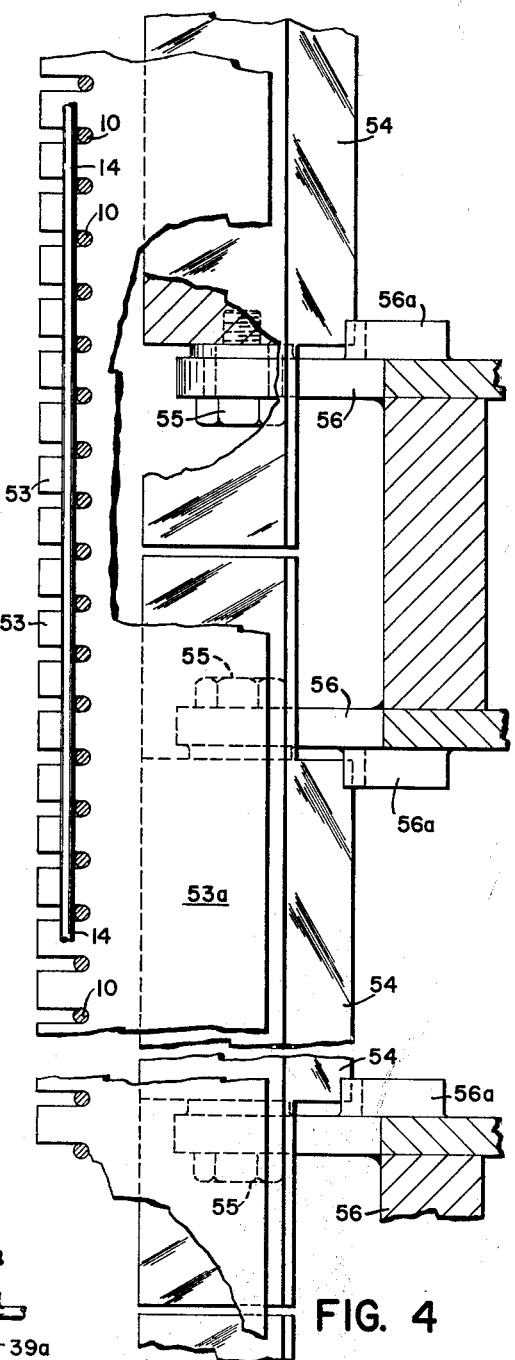
FIG. 4 is a fragmentary transverse section taken on line 4—4 of FIG. 2, drawn to the same scale as FIG. 3 and showing the mesh advancing fingers in plan view.

The sectional supports 54 for the continuous body plate 53a are comparatively short and each support comprises a substantially square bar (or its equivalent in a composite welded structure). Pivot screws 55 pass through ears on each bracket 56 and are threaded into apertures at the opposite ends of support section 54, as shown in FIG. 4. Stop lugs 56a are formed on brackets 56 to engage the rear lower corner of each of the support sections 54, and a coil spring (not shown) urges these parts into engagement so that the fingers 53 normally project in a horizontal direction to engage the cross-wires of the welded fabric. During the downward motion of fingers 53 to pick up the next lower cross wire 14, supports 54 pivot on the screws 55 and swing up to the right, allowing the fingers to pass beneath the cross-wire. Brackets 56 are tied together by a bar 58a (FIG. 2) which extends from side to side of the machine and is secured to each of the bracket extensions 58 by screws 58b.

The cross or stay wires 14 consist of suitable lengths (in this case six feet) of wire cut successively from a reel of wire which is supported at one side of the machine with the end portion of the wire from the coil fed into an index drum 62 (FIG. 1). This drum, as shown has equally spaced slots around its periphery so that the wire can be fed into one of these slots, such for example as at 63. Drum 62 is actuated by a step-by-step mechanism to be described and in step with a cutting mechanism to cut off a length of wire which may take place as slot position 63 advances to position 64.

At position 64 a series of sweep fingers 65 carried on an oscillating shaft 66 pick up a length of wire and move it along a series of curved guiding slots 67 and thereby deliver it at the welding point 15. This wire is accurately positioned at the welding point in a manner which will be described in detail below.

The actuating mechanism for the index drum 62 and sweep fingers 65 is shown at the right of FIG. 7 and in this figure shaft 66 which carries the sweep fingers 65 is about in horizontal alignment with shaft 28. Immediately below shaft 66 is shaft 68 for the index drum 62. On the left end of shaft 68 a ratchet wheel 69 is mounted which is actuated by a ratchet 70 pivoted on one arm of a two armed rocker 71 which oscillates freely on shaft 68.

The second arm of rocker 71 is connected by means of an adjustable link 72 to a lever 73 which is pivoted at 74 to machine frame 19, and which is actuated by means of a cam 75 which engages a roller 76 on the lower end of lever 73. Cam 75 is fixed to a shaft 75a which is rotated by means of an endless chain 77 from shaft 28.

Sweep fingers 65 mounted on shaft 66 are also actuated by the rotation of shaft 28 by means of a cam 78 fixed to this shaft. Coacting roller 79 is mounted on an upright lever 80 pivoted to the frame 81 and connected at its upper end by means of a link 82 to a short actuating arm 83 mounted on shaft 66. By the arrangement just described, with each rotation of shaft 28 which operates the electrode beams 21, a new length of stay wire is cut off and advanced to position 64 in front of the sweep fingers 65 and then moved by these fingers to the welding position 15.

The operation of the machine is as follows:

Starting with the electrode beam 21 moved to the left, as shown in FIGS. 1 and 2, the lowermost crosswire 14 at welding position 15 has been clamped between the movable electrodes 16 and the stationary electrodes 17, clamping pressure being applied by the compression of coil springs 20. The welding of this stay or cross-wire to each of the vertical strand or warp wires 10 has been completed and the welding current cut off by cam operated switch 101 (see below).

Electrode beam or frame 21 is now moved to the right to approximately the position shown in FIG. 6, thus separating the two rows of electrodes 16 and 17, and withdrawing gauge fingers 38 and 39 from the fabric. The timing of the cams 46 and 47 which actuate the feed fingers 53 through oscillating arms 44 is such that these fingers cause the completed fabric and longitudinal or strand wires 10 to begin to rise at about the instant fingers 38 and 39 are clear of the fabric. When feed fingers 53 are about halfway of the desired total advance, cams 26 and 27 have moved arms 24 and electrode beam 21 a sufficient amount in the return or left hand direction so that the gauge fingers 38 are above the cross or stay wire 14 that was just welded.

Gauge fingers 38 dwell in this position while feed fingers 53 complete the advance of the welded mesh fabric and cause the stay wire 14 just welded to be drawn or pulled firmly against the bottom of gauge fingers 38 which stop the further upward advance of the welded fabric. This places the top of the lowermost cross-wire 14 at a distance D, or 1″, from the faces of gauge fingers 39 (FIG. 2A). Any continued upward movement of advance beam 43 and fingers 53 which may take place thereafter is permitted by the compression of coil springs 59, as previously described.

The sweep fingers 65 are now actuated, as previously described, by cam 78 on shaft 28 (FIG. 7), to move a new length of stay wire 14a (FIG. 2A) from index drum 62 to welding position 15. These fingers press the wire firmly against the bottoms of gauge fingers 39 which serve as stop fingers, and position the new wire precisely in alignment with the two rows of welding electrodes 16 and 17, and against the vertical or longitudinal wires 10. The top of new wire 14a is located precisely at the distance D, or, in this instance, 1″, below the top of the previously welded stay wire 14. Sweep fingers 65 dwell in this position while cam shaft 28 continues its rotation and until the electrode beam 21 is moved from the position of FIG. 6 back to the position of FIGS. 1 and 2.

Cams 26 and 27 on shaft 28, which actuate arms 24, move the electrode beam 21 to cause the electrodes 16 and 17 to squeeze the new cross-wire 14a against the individual strand or longitudinal wires 10, such clamping pressure being determined by the strength of coil springs 20 at the front of each of the electrode holders 17a for the stationary electrodes 17. The welding current is now switched on by conventional switching gear (not shown) to cause the welding operation to take place, joining new cross or stay wire 14a to each of the strand wires 10.

Sweep arms 65 dwell in their upper position until after the welding operation is completed so as to hold crosswire 14a accurately in position against gauge fingers 39 during the welding operation. As soon as the welding is completed, sweep fingers 65 are returned to their lower position as shown in FIG. 1, to receive the next length of wire from slot position 64 of the index drum 62. This completes a cycle of operation of the machine, and it will be understood that during each rotation of cam shaft 28, the machine is carried through a complete operating cycle.

Referring again to FIG. 2A, cross-wire 14 which has just been welded has been raised against the lower or gauging surfaces of the series of gauging fingers 38 by the upward motion of the feeding fingers 53, and as previously described, fingers 38 serve to prevent further upward advance of the wires 10 and cross-wire 14. It is necessary, therefore, that gauge fingers 38 be of rugged construction inasmuch as they, in order to stop the movement of the welded fabric, must cause compression of springs 59, at the top of advance beam 43, which permits the overtravel of the advance beam after completion of the feeding movement.

When the new length of cross or stay wire 14a (FIG. 2A) is raised into the welding position by sweep fingers 65, the upper surface of this wire is brought into engagement with the stop fingers 39, and since fingers 38 and 39 both engage the top sides of the respective cross wires, there can be no error in gauging the dimension of the mesh, that is, the vertical distance between adjacent stay wires 14, which would be occasioned by variation in the diameter of these wires. In other words, the gauging is independent of wire diameter.

Referring again briefly to FIGS. 2 and 6 the welding current is conducted to the movable electrode holders 16a by means of three bus bars 84, 85 and 86. These are heavy copper bars, an inch or more in thickness and several inches in height and they extend across the width of the machine and, therefore, they are somewhat over 6′ in length. With a machine set up to make 1″ welded mesh fabric, there will be 72 electrodes and electrode holders. Every third electrode holder 16a is connected to bus bar 84 and insulated from the other two bars as indicated. Similarly, the next electrode holder is connected to bus 85 and insulated from the other two buses and every third electrode holder from it is likewise connected to bus 85 and insulated from the other two bus bars. Similarly for bus 86.

Bus bars 84, 85 and 86 (FIG. 6) are connected to the respective secondaries 94, 95 and 96 of a three phase Y-connected welding transformer by conductors as indicated. All of these parts are shown diagrammatically. In order to complete the secondary welding circuits all of the stationary electrodes 17 are connected together. This is done by means of the electrode holders 17a and their supports 18 which are connected throughout the width of the machine by member 87.

At this portion of FIG. 6 there is also shown the three power supply conductors 97, 98 and 99 which are connected to the primary winding 100 of the welding transformer by means of a switch mechanism 101 which is operated by a solenoid coil 102. In order to control the welding circuit, closing it and opening it at the proper times, current for operating solenoid coil 102 is taken from two of the supply conductors through wires 103, switch contacts 104, connection 105 and wire 106. Switch contacts 104 are actuated by means of a cam 107 on cam shaft 28 which is arranged to close these contacts after beam 21 has caused the electrodes 16 and 17 to clamp the cross wire and longitudinal wires 10 between them, and to open them before beam 21 is actuated in the reverse direction to separate the movable electrodes 16 from wires 10.

It will be understood that only a brief outline of the electrical circuit connections has been mentioned in the previous paragraph, and that any desired system for controlling the welding current in timed relation to the operation of the electrodes to and from welding position, may be employed.

At each upward feed of the welded fabric by the advance mechanism including feed fingers 53, the completed fabric must be advanced by a corresponding amount. This is accomplished by means of feed roll 13 which is operatively connected with shaft 36 by mechanism not shown. When it is desired to set up the apparatus to produce welded fabric of a different mesh, for example, 2" instead of 1" mesh, the body plate 41, carrying gauge fingers 38, is shifted upwardly on mounting plate 40 to provide a 2" gauging distance D between gauge fingers 38 and 39. It is also necessary, however, to change the rate of rotative speed of feed roll 13, and this is done by replacing change gears 37 (FIG. 7) on shafts 35 and 36 with a different set of gears which will provide the desired rotative speed for shaft 13.

Tension control roll 12, by which the desired tension on the longitudinal wires 10 is regulated, turns freely on a shaft 88 and is supported by a series of arms 89 arranged in spaced relation across the width of the machine, one of these arms being shown in FIG. 1. Arms 89 are pivotally mounted on a cross shaft 90 fixed to the machine frame 19.

The weight of tension roll 12 and the parts just described is supplemented by means of a fluid pressure cylinder 91 in order to control and regulate the tension and keep it within prescribed limits. One or more cylinders 91 may be employed, the plunger 92 of each being pivotally connected to an extension 93 of arm 89.

My invention has been described in connection with one particular form of welded mesh making machine. It will therefore be understood that the scope of the invention is set forth in the appended claims.

I claim:

1. In a machine for making welded wire fabric having means for supporting in parallel spaced relation and under appropriate tension a plurality of wires to form the warp wires of the fabric and having a row of stationary electrodes and a row of movable electrodes cooperating therewith at a welding position, the movable electrodes being carried on a frame having movement toward and away from said stationary electrodes, the improvement which comprises a gauge plate mounted on the frame, two rows of gauging fingers mounted on the gauge plate and movable by the frame into and out of the plane of the welded fabric, the fingers of both said rows having their faces projecting in the same direction opposite to the direction of fabric movement, means for imparting step-by-step movement to the fabric for each welding operation, each advance movement of the fabric being stopped at welding position by engagement of a cross wire of the fabric with one of said rows of gauge fingers, and mechanism for feeding cross wires successively to welding position, said wires being stopped at said position by engagement with said other row of gauge fingers.

2. In a machine for making welded wire fabric having means for supporting in parallel spaced relation and under appropriate tension a plurality of wires to form the warp wires of the fabric and having a row of stationary electrodes and a row of movable electrodes cooperating therewith at a welding position, the movable electrodes being carried on a frame having movement toward and away from said stationary electrodes, the improvement which comprises two rows of gauging fingers movable with the frame into and out of the plane of the welded fabric, the fingers of both said rows having their faces projecting in the same direction opposite to the direction of fabric movement, means for imparting step-by-step movement to the fabric for each welding operation, each advance movement of the fabric being stopped at welding position by engagement of a cross wire of the fabric with one of said rows of gauge fingers, and mechanism for feeding cross wires successively to welding position, said wires being stopped at said position by engagement with said other row of gauge fingers, at least one of said rows of gauging fingers being mounted on said frame in adjustable relation to said other row of gauge fingers to vary the mesh size of the fabric being welded, and the means for imparting step-by-step movement to the fabric for each welding operation being also adjustable to impart a greater or smaller step movement corresponding to the adjustment of said gauge fingers.

3. In apparatus for making welded wire fabric, means for supporting in parallel spaced relation and under appropriate tension a plurality of wires to form the warp wires of the fabric, means for feeding a cross wire into contact with said warp wires at a welding position, a plurality of stationary electrodes for contacting said cross wire at said welding position, a beam movable at right angles to said warp wires carrying a plurality of electrodes for contacting said warp wires opposite said cross wire, first and second rows of gauge fingers projecting from said beam, the fingers of said first row being adjacent the respective electrodes on said beam and the said second row of fingers being spaced from the first row to provide the desired mesh size, said cross wire feeding means moving said cross wire against said first row of gauge fingers to position the wire, operating mechanism for said beam to cause it to squeeze the warp wires and the cross wire between said stationary and movable electrodes and to project said gauge fingers into the plane of said fabric, means for applying welding current, said beam operating mechanism thereafter moving said beam to withdraw the movable electrodes from contact with said warp wires and said gauge fingers from the plane of said fabric, fabric feeding fingers arranged to move parallel with the plane of said warp wires and fabric, means for actuating said fabric feeding fingers after said gauge fingers have been withdrawn from the plane of the fabric to engage a previously welded cross wire beyond the welding position and advance the warp wires and completed fabric with respect to said welding position for a succeeding welding operation, said beam operating mechanism moving to return the beam and movable electrodes to welding position and said gauge fingers into the plane of the fabric, the advance of the warp wires and completed fabric by said fabric feeding fingers being stopped by the engagement of the last welded cross wire with said second row of gauge fingers.

4. In a machine for making welded wire fabric, means for supporting in parallel spaced relation and under appropriate tension in vertical position a plurality of wires to form the warp wires of the fabric, means for feeding a cross wire into contact with said warp wires at a welding position, a plurality of stationary electrodes for contacting said cross wire at said welding position, a horizontal, movable beam carrying a plurality of electrodes for contacting said warp wires opposite said cross wire, said beam being supported on a series of spaced substantially upright rocker arms, said arms carrying said beam at their upper ends and having fixed pivots below, a cam shaft extending lengthwise of said beam and having cams thereon cooperating with the upper portions of said respective arms for moving said beam toward and away from said welding position, and fabric feeding mechanism comprising a member carrying spaced feeding fingers for engaging the meshes of the welded fabric above said welding position, a series of spaced substantially horizontal, oscillating pivoted arms disposed across the width of the machine for supporting said member, a second cam shaft extending lengthwise of said plate and having cams thereon and operating connections to said respective arms for imparting oscillating movement thereto in timed relation to the movement of said beam toward and away from said welding position, stop fingers for stopping the advance movement of the fabric mounted on said electrode supporting beam, a second set of stop fingers also being carried by said beam for stopping the feeding movement of the cross wire at said welding position, the spacing of said two sets of stop fingers being adjustable according to the mesh size of the fabric to be welded, and the operating connections between the cams on said second cam shaft and said oscillating arms also being correspondingly adjustable.

References Cited in the file of this patent

UNITED STATES PATENTS

| | | |
|---|---|---|
| 633,213 | Perry | Sept. 19, 1899 |
| 1,093,297 | Southwick | Apr. 14, 1914 |
| 1,485,827 | Bull | Mar. 4, 1924 |
| 1,923,369 | Gronemeyer et al. | Aug. 22, 1933 |
| 2,373,243 | Grimson | Apr. 10, 1945 |
| 2,962,059 | Rosler | Nov. 29, 1960 |
| 3,008,496 | Goddard | Nov. 11, 1961 |